Feb. 15, 1966   G. W. BLACKWOOD ETAL   3,235,114
JAR SEAL
Filed March 1, 1962   2 Sheets-Sheet 1

INVENTORS
George W. Blackwood
Donald D. Hundt
BY

INVENTOR
George W. Blackwood
Donald D. Hundt
BY *Jules H. Steinberg*

3,235,114
JAR SEAL
George W. Blackwood, Winchester, and Donald D. Hundt, Arlington, Mass., assignors to W. R. Grace & Co., Cambridge, Mass., a corporation of Connecticut
Filed Mar. 1, 1962, Ser. No. 176,538
3 Claims. (Cl. 215—40)

The present invention relates to a novel closure for jars and similar containers. More particularly, the present invention relates to a jar cover having a novel separate plastic insert with a resilient, spring-like annulus having a peripheral channel for retention of the sealing composition.

Conventional jar covers are usually provided with a relatively wide annular channel which is substantially filled by a gasket of sealing material. Such a channel generally contains considerably more of the sealant than is actually required to effect the seal for several reasons. For one thing, it is not commercially feasible in the conventional arrangement to position the sealing composition in the precise area above or around the lip of the glass jar. Moreover, since the glass finish of the jar lip is often irregular in some respects, it is generally thought in the art that the sealing composition must be relatively deep in order to accommodate such irregularities, i.e. to tightly seal the jar at all points around its lip. These are the primary reasons for the relatively wide, thick sealing gaskets which are characteristically found today in commercial jar lids.

Another feature generally found in conventional caps is the provision of a coat of lacquer on the interior surface to protect the exposed portion of the cap from the contents of the container which might otherwise corrode the metal of the cap.

The principal object of the present invention is to provide a jar cover with sealing means which utilizes significantly less sealing composition than is ordinarily required in conventional caps. An ancillary object of the invention is the provision of such a sealing means which will protect the interior of the cap with or without a separate lacquer coating. A further object of the present invention is the provision of such a jar cover which is economical and convenient to manufacture and assemble and which is handy and easy to use and to re-use. Other and additional objects will become apparent from a consideration of the ensuing specification and claims.

Broadly stated, the present invention involves the provision of a cover for jars having a separate, flexible plastic insert secured within the cap. The insert has a peripheral, resilient, spring-like annulus having a relatively narrow annular channel for receipt and retention of sealing composition that, while relatively minimal in amount, will nevertheless accomplish an effective and reliable seal in the fully assembled container.

The invention will be better understood if considered in conjunction with the attached drawings in which—

Figure 1:
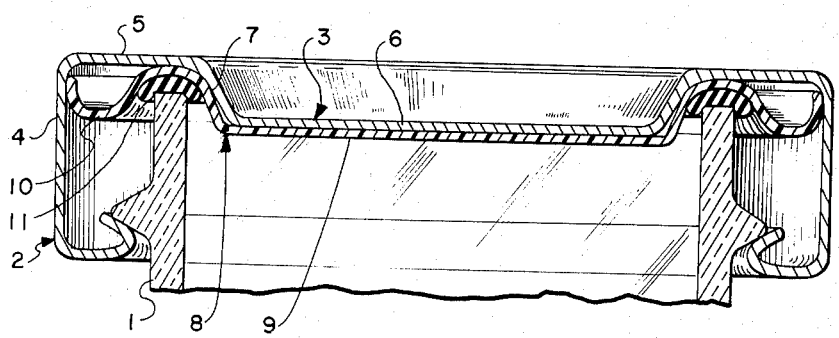
FIGURE 1 represents a cross-sectional view of one embodiment of a closure prepared in accordance with the concept of the present invention in position atop a glass jar.

In FIGURE 1 of the attached drawing, there is shown the top of a jar 1 having a cover 2 removably affixed thereon. The cover 2 has a panel portion, designated in its entirety at 3 in FIGURE 1 and a skirt 4 depending from the panel portion at its outer periphery. The top portion 3 has an elevated portion at its outer edge, indicated at 5, to provide an annular channel all the way around the outer circumference of the panel. The elevated portion is connected to a central recessed portion 6 by an inclined ledge 7.

There is positioned within the cover 2 a flexible plastic insert, designated generally at 8 in FIGURE 1, which in its entirety is coextensive with the undersurface of the panel portion 3 of the cover. The insert 8 consists of a central disc 9 which is integral at its circumference with a resilient annulus, shown at 10. In the embodiment of FIGURE 1, the annulus 10 has an S-shaped cross section with the S lying on its side. The inner leg of the S provides a curved channel for retention of the sealing composition 11.

In assembled relation on a glass jar, the upper lip of the glass jar 1 is impressed against the bottom surface of sealing composition 11, which by virtue of the arrangement of the present invention is positioned just above and/or around the lip of the jar. The inherent resiliency of the annulus 10 of the plastic insert 8 enables the peripheral portion of the insert to flex under pressure from the tightening cover and thus contributes materially to a better, tighter seal between the lip of the glass jar 1 and the sealing composition 11. This effect is enhanced in the embodiment shown by the configuration of the curved annulus 10 by reason of the flexible, spring-like action of the endwise S-shape.

It will be readily apparent from the foregoing description that the present invention provides a unique mechanism for positioning sealing composition within a closure cover. In a conventional cap, the channel defined by the portions 5, 7 and the top part of skirt 4 in the cover 2 would be substantially filled with sealing composition, most of which does not really contribute to the actual sealing of the container, but serves merely to insure that the composition which does do the sealing is in the proper position. Moreover, due to the inherent inflexibility of the metallic cover 2, this composition must be relatively deep in order to accommodate, i.e. to effectively seal, a jar with a poor quality glass finish. These disadvantages of the conventional prior art arrangement are substantially overcome by the present invention.

Moreover, since the undersurface of the cover of the present invention is completely insulated from the contents of jar 1 by the combined action of the wall of the container, the sealing composition 11, and the insert 8, there is no need to coat this surface with lacquer for protective purposes as is conventionally done in the trade.

The insert 8 may be held in position within the cap by any convenient means. For example, it may be retained by friction fit, i.e. by bearing against the inner wall of the skirt portion 4 of the cap. Alternatively, a suitable crimp (not shown) may be provided in skirt 4 just below the outermost portion of the insert 8, or the insert may be secured to the cap by a suitable adhesive composition, positioned for example, between the upper surface of portion 9 of the insert and the inner surface of portion 6 of the cap.

The configuration of plastic insert 8 shown in FIGURE 1 in the attached drawings represent but one embodiment of the invention. The endwise S-shape of annulus 10 in this figure is a simple, convenient, and effective way for accomplishing the principal objectives of the invention, viz. a resilient, spring-like annular channel for retention of a minimal quantity of sealing composition in a precise predetermined position. However, there are other configurations for the insert that are at least as effective as that shown in FIGURE 1, and in some respects are actually superior.

Figure 2A:
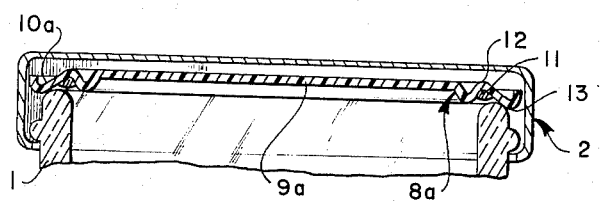
FIGURE 2A is a cross-sectional view of an alternative embodiment of the invention in which the closure is sitting loosely atop the jar prior to tightening.
Figure 2B:
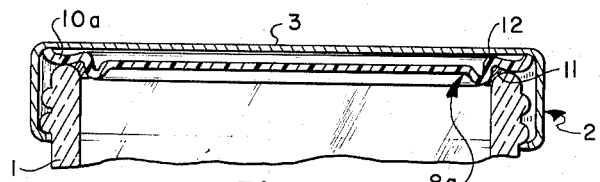
FIGURE 2B is a cross-sectional view of the closure of FIGURE 2A after the cover has been fully tightened.
Figure 3A:
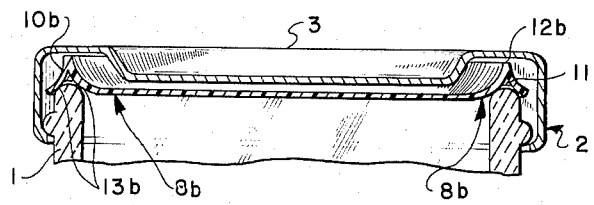
FIGURE 3A is a cross-sectional view of a further alternative embodiment of the invention in which the closure is sitting loosely atop the jar prior to tightening.
Figure 3B:
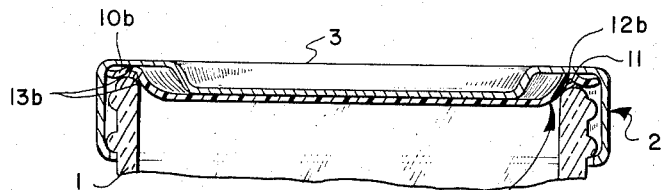
FIGURE 3B is a cross-sectional view of the closure of FIGURE 3A after the closure has been fully tightened.
Figure 4A:
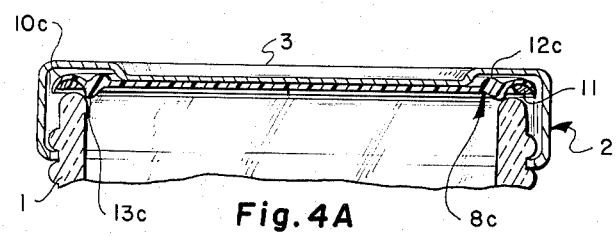
FIGURE 4A is a cross-sectional view of a still further alternative embodiment of the invention in which the closure is sitting loosely atop the jar prior to tightening.
Figure 4B:
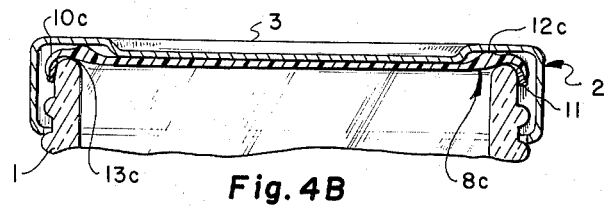
FIGURE 4B is a cross-sectional view of the closure of FIGURE 4A after the closure has been fully tightened.

In FIGURE 2A, there is shown an alternative embodiment of the invention in which the insert 8a has a central disc 9a and a resilient annulus 10a. The annulus 10a has an upward protrusion 12 which bears against the undersurface of the top 3 of cover 2. There is a contact point 13 spaced laterally outwardly of protrusion 12 at which the annulus 10a of insert 8a first contacts the lip of jar 1 when the closure is placed loosely in position atop the jar. In this position, there is no contact between the lip of the jar and sealing composition 11. As the cover 2 is rotated to tighten the closure, the portion of the annulus 10a outward of protrusion 12 flexes upwardly about protrusion 12 due to the upward force being supplied at point 13. When this upward flexing occurs, the upper edge of the lip of jar 1 is forced into very tight engagement with sealing composition 11 as shown in FIGURE 2B. So long as the closure remains in the tight assembled relation illustrated in FIGURE 2B, the inherent resilience of annulus 10a, which has been deflected upwardly, will cause the annulus to press down, about protrusion 12, with substantial force. This serves to keep sealing composition 11 forced tightly against the lip of jar 1 which results in a very effective seal.

FIGURES 3A, 3B and 4A, 4B illustrate still further alternative embodiments of the invention which are essentially self-evident from the drawings. The embodiments of these figures operate in much the same fashion as that of FIGURES 2A, 2B. The insert 8b of FIGURES 3A and 3B has an annulus 10b with protrusion 12b and contact points 13b. The insert 8c of FIGURES 4A and 4B has an annulus 10c with protrusion 12c and contact point 13c.

Any plastic material may be used to form the insert 8, etc. provided only that it exhibits a substantial inherent resiliency and flexibility after fabrication. As used herein, "flexible," "flexibility," "resilient" and "resiliency" refer to the ability of annulus 10, etc. of the insert 8, etc., which is the carrier for the ring of sealing composition 11, to depress or flex when subjected to pressures of the magnitude encountered when a jar closure or the like is placed in assembled relation atop a jar or similar container. In most instances, the relatively inexpensive, commercially-available thermoplastic materials such as polyethylene, polypropylene, polystyrene, polyvinylchloride and the like will be found particularly convenient and economical, though other plastics may be used, including thermosetting resins. Metallic inserts would not be within the scope of the invention since they would not generally exhibit sufficient flexibility for this use, and would usually present a corrosion problem.

In the attached drawings, the cover 2 is depicted as being of the so-called lug type. It will be readily understood, however, that the concept of the present invention is equally applicable to other kinds of screw-type covers.

Likewise, the raised portion 5, 7 of the cap shown in FIGURE 1 of the drawings may be dispensed with and a cap with a perfectly flat and uniform upper surface may be provided, as illustrated in FIGURES 2A, 2B, since the channel provided by the portions 5 and 7 of the cover in FIGURE 1 is not needed for retention of the sealing compound in the closure of the present invention. A flat cover will be preferred in some instances inasmuch as some commercial canners feel this is more appealing to the eye.

The closure of the present invention is applicable to any container formed from glass or other suitable material which has a relatively wide mouth such that the closure is sealed with an annular ring or gasket of sealing composition as distinguished from narrow necked containers, such as are customarily used for packaging of carbonated beverages, which are capped with small diameter crown closures that generally have their entire undersurface coated with cork or plastic in lieu of an annular sealing gasket.

The invention has been described and illustrated in the foregoing specification. It will be readily apparent to those skilled in the art that many modifications and variations may be made without departing from the spirit or scope of the invention. It is intended, therefore, that the invention be limited only by the scope of the following claims.

What is claimed is:

1. A container closure comprising a cover member having a generally circular panel portion and a peripheral skirt depending from the outer edge of said panel portion, a separate flexible plastic insert member secured within said cover directly adjacent the underside of said panel portion and substantially coextensive therewith, said insert member having a central flat disc portion which is integral at its circumference with a continuous peripheral resilient annulus that has a generally endwise S-configuration in cross-section, and a ring of sealing composition positioned in the arcuate leg of the S-shaped annulus which is closest to the central disc portion.

2. A closure for a jar comprising a cover having a generally circular panel portion and a peripheral skirt depending from the outer edge of the panel portion, a separate flexible plastic insert member secured within said cover directly adjacent the underside of the panel portion, said insert member in its entirety being generally coextensive with said panel portion and having a resilient annulus containing a realtively narrow annular channel, and a sealing composition positioned within said narrow channel, said spring-like annulus having an upward protrusion on the top surface thereof which is in contact with the undersurface of the panel portion of the cover and a contact point on the underside of the annulus spaced laterally from the upward protrusion which, upon assembly of the closure atop the jar, will physically contact the lip of the jar before any portion of the latter is brought into contact with the sealing composition.

3. A closure for a jar comprising a cover having a generally circular panel portion and a peripheral skirt depending from the outer edge of the panel portion, a separate plastic insert member secured within said cover directly adjacent the underside of the panel portion, said insert member in its entirety being generally coextensive with said panel portion and having a resilient annulus containing a relatively narrow annular channel, and a sealing composition positioned within said narrow channel, said spring-like annulus having an upward protrusion on the top surface thereof which is in contact with the undersurface of the panel portion of the cover and a contact point on the underside of the annulus spaced laterally from the upward protrusion which, upon assembly of the closure atop the jar, will physically contact the lip of the jar before any portion of the latter is brought into contact with the sealing composition whereby tightening of the closure on the jar will force the resilient annulus to flex and bring the lip of the jar into tight physical engagement with sealing composition.

References Cited by the Examiner

UNITED STATES PATENTS

| | | | |
|---|---|---|---|
| 976,659 | 11/1910 | Keeran | 215—43 |
| 1,318,112 | 10/1919 | Savage | 215—43 |
| 1,995,350 | 3/1935 | Hoag | 215—43 |

FOREIGN PATENTS

| | | |
|---|---|---|
| 1,101,055 | 9/1955 | France. |
| 498,700 | 10/1950 | Italy. |
| 845,759 | 7/1949 | Netherlands. |

JOSEPH R. LECLAIR, *Primary Examiner.*

EARLE J. DRUMMOND, FRANKLIN T. GARRETT,
*Examiners.*